(12) United States Patent
Uyehara et al.

(10) Patent No.: US 8,837,659 B2
(45) Date of Patent: Sep. 16, 2014

(54) DISTRIBUTED DIGITAL REFERENCE CLOCK

(71) Applicant: ADC Telecommunications, Inc., Shakopee, MN (US)

(72) Inventors: Lance K. Uyehara, San Jose, CA (US); Larry G. Fischer, Waseca, MN (US); David Hart, Sunnyvale, CA (US); Dean Zavadsky, Shakopee, MN (US)

(73) Assignee: ADC Telecommunications, Inc., Shakopee, MN (US)

( * ) Notice: Subject to any disclaimer, the term of this patent is extended or adjusted under 35 U.S.C. 154(b) by 0 days.

(21) Appl. No.: 13/914,838

(22) Filed: Jun. 11, 2013

(65) Prior Publication Data

US 2013/0272463 A1   Oct. 17, 2013

Related U.S. Application Data

(63) Continuation of application No. 12/845,060, filed on Jul. 28, 2010, now Pat. No. 8,472,579.

(51) Int. Cl.
*H03L 7/00* (2006.01)
*H04L 7/00* (2006.01)
*H04J 3/06* (2006.01)
*H04W 28/04* (2009.01)

(52) U.S. Cl.
CPC ............. *H04L 7/0008* (2013.01); *H04W 28/04* (2013.01); *H04J 3/0685* (2013.01)
USPC ........................................................ 375/356

(58) Field of Classification Search
USPC ........................................ 455/16, 560, 562.1
See application file for complete search history.

(56) References Cited

U.S. PATENT DOCUMENTS

| | | | |
|---|---|---|---|
| 4,183,054 A | 1/1980 | Patisaul et al. | |
| 4,451,916 A | 5/1984 | Casper et al. | |

(Continued)

FOREIGN PATENT DOCUMENTS

| | | |
|---|---|---|
| CA | 2058736 | 7/1993 |
| CA | 2058737 | 7/1993 |

(Continued)

OTHER PUBLICATIONS

European Patent Office, "Extended European Search Report", "from Foreign Counterpart of U.S. Appl. No. 12/845,060", Aug. 14, 2013, pp. 1-6, Published in: EP.

(Continued)

*Primary Examiner* — Chieh M Fan
*Assistant Examiner* — Wednel Cadeau
(74) *Attorney, Agent, or Firm* — Fogg & Powers LLC (57) ABSTRACT

A communication system includes master host unit, hybrid expansion unit, and remote antenna unit. Master host unit communicates analog signals with service provider interfaces. Master host unit and hybrid expansion unit communicate N-bit words of digitized spectrum over communication link. Hybrid expansion unit converts between N-bit words and analog spectrum. Hybrid expansion unit and remote antenna unit communicate analog spectrum over analog communication medium. Remote antenna unit transmits and receives wireless signals over air interfaces. Master host unit includes master clock distribution unit that generates digital master reference clock signal. Master host unit communicates digital master reference clock signal over communication link. Hybrid expansion unit receives digital master reference clock signal from master host unit over communication link and generates analog reference clock signal based on digital master reference clock signal. Hybrid expansion unit sends, and remote antenna unit receives, analog reference clock signal across analog communication medium.

39 Claims, 7 Drawing Sheets

(56) References Cited

U.S. PATENT DOCUMENTS

| | | | |
|---|---|---|---|
| 4,611,323 | A | 9/1986 | Hessenmuller |
| 4,628,501 | A | 12/1986 | Loscoe |
| 4,654,843 | A | 3/1987 | Roza et al. |
| 4,691,292 | A | 9/1987 | Rothweiler |
| 4,999,831 | A | 3/1991 | Grace |
| 5,193,109 | A | 3/1993 | Lee |
| 5,243,598 | A | 9/1993 | Lee |
| 5,303,287 | A | 4/1994 | Laborde |
| 5,321,736 | A | 6/1994 | Beasley |
| 5,321,849 | A | 6/1994 | Lemson |
| 5,339,184 | A | 8/1994 | Tang |
| 5,377,255 | A | 12/1994 | Beasley |
| 5,381,459 | A | 1/1995 | Lappington |
| 5,400,391 | A | 3/1995 | Emura et al. |
| 5,461,627 | A | 10/1995 | Rypinski |
| 5,519,691 | A | 5/1996 | Darcie et al. |
| 5,545,397 | A | 8/1996 | Spielvogel et al. |
| 5,566,168 | A | 10/1996 | Dent |
| 5,621,786 | A | 4/1997 | Fischer et al. |
| 5,627,879 | A | 5/1997 | Russell et al. |
| 5,634,191 | A | 5/1997 | Beasley |
| 5,642,405 | A | 6/1997 | Fischer et al. |
| 5,644,622 | A | 7/1997 | Russell et al. |
| 5,657,374 | A | 8/1997 | Russell et al. |
| 5,678,177 | A | 10/1997 | Beasley |
| 5,682,256 | A | 10/1997 | Motley et al. |
| 5,687,195 | A | 11/1997 | Hwang et al. |
| 5,732,076 | A | 3/1998 | Ketseoglou et al. |
| 5,761,619 | A | 6/1998 | Danne et al. |
| 5,765,099 | A | 6/1998 | Georges et al. |
| 5,781,541 | A | 7/1998 | Schneider |
| 5,781,859 | A | 7/1998 | Beasley |
| 5,802,173 | A | 9/1998 | Hamilton-Piercy et al. |
| 5,805,983 | A | 9/1998 | Naidu et al. |
| 5,809,395 | A | 9/1998 | Hamilton-Piercy et al. |
| 5,822,324 | A | 10/1998 | Kostresti et al. |
| 5,845,199 | A | 12/1998 | Longshore |
| 5,852,651 | A | 12/1998 | Fischer et al. |
| 5,867,485 | A | 2/1999 | Chambers et al. |
| 5,870,392 | A | 2/1999 | Ann |
| 5,890,055 | A | 3/1999 | Chu et al. |
| 5,907,544 | A | 5/1999 | Rypinski |
| 5,914,963 | A * | 6/1999 | Basile ............................ 714/700 |
| 5,924,022 | A | 7/1999 | Beasley et al. |
| 5,987,014 | A | 11/1999 | Magill et al. |
| 6,023,628 | A | 2/2000 | Beasley |
| 6,034,950 | A | 3/2000 | Sauer et al. |
| 6,108,113 | A | 8/2000 | Fee |
| 6,108,550 | A | 8/2000 | Wiorek et al. |
| 6,108,626 | A | 8/2000 | Cellario et al. |
| 6,157,659 | A | 12/2000 | Bird |
| 6,157,810 | A | 12/2000 | Georges et al. |
| 6,188,693 | B1 | 2/2001 | Murakami |
| 6,222,660 | B1 | 4/2001 | Traa |
| 6,226,274 | B1 | 5/2001 | Reese et al. |
| 6,246,675 | B1 | 6/2001 | Beasley et al. |
| 6,373,887 | B1 | 4/2002 | Aiyagari et al. |
| 6,377,640 | B2 | 4/2002 | Trans |
| 6,498,936 | B1 | 12/2002 | Raith |
| 6,567,473 | B1 | 5/2003 | Tzannes |
| 6,667,973 | B1 | 12/2003 | Gorshe et al. |
| 6,674,966 | B1 | 1/2004 | Koonen |
| 6,704,545 | B1 * | 3/2004 | Wala ............................ 455/16 |
| 6,729,929 | B1 | 5/2004 | Sayers et al. |
| 6,768,745 | B1 | 7/2004 | Gorshe et al. |
| 6,785,558 | B1 | 8/2004 | Stratford et al. |
| 6,826,163 | B2 | 11/2004 | Mani et al. |
| 6,826,164 | B2 | 11/2004 | Mani et al. |
| 6,831,901 | B2 | 12/2004 | Millar |
| 6,865,390 | B2 | 3/2005 | Goss et al. |
| 6,917,614 | B1 | 7/2005 | Laubach et al. |
| 6,963,552 | B2 | 11/2005 | Sabat, Jr. et al. |
| 7,127,175 | B2 | 10/2006 | Mani et al. |
| 7,205,864 | B2 | 4/2007 | Schultz, Jr. et al. |
| 7,215,651 | B2 | 5/2007 | Millar |
| 7,289,972 | B2 | 10/2007 | Rieser et al. |
| 7,313,415 | B2 | 12/2007 | Wake et al. |
| 7,733,901 | B2 | 6/2010 | Salkini et al. |
| 7,761,093 | B2 | 7/2010 | Sabat, Jr. et al. |
| 7,920,858 | B2 | 4/2011 | Sabat, Jr. et al. |
| 2001/0036163 | A1 | 11/2001 | Sabat, Jr. et al. |
| 2001/0044292 | A1 | 11/2001 | Jeon et al. |
| 2002/0142739 | A1 | 10/2002 | Smith |
| 2002/0167954 | A1 | 11/2002 | Highsmith et al. |
| 2002/0191565 | A1 | 12/2002 | Mani et al. |
| 2003/0015943 | A1 | 1/2003 | Kim et al. |
| 2003/0043928 | A1 | 3/2003 | Ling et al. |
| 2003/0203717 | A1 | 10/2003 | Chuprun et al. |
| 2004/0010609 | A1 | 1/2004 | Vilander et al. |
| 2004/0032354 | A1 | 2/2004 | Knobel et al. |
| 2004/0037565 | A1 | 2/2004 | Young et al. |
| 2004/0053602 | A1 | 3/2004 | Wurzburg |
| 2004/0106387 | A1 | 6/2004 | Bauman et al. |
| 2004/0106435 | A1 | 6/2004 | Bauman et al. |
| 2004/0132474 | A1 | 7/2004 | Wala |
| 2004/0198453 | A1 | 10/2004 | Cutrer et al. |
| 2004/0203339 | A1 | 10/2004 | Bauman |
| 2004/0203703 | A1 | 10/2004 | Fischer |
| 2004/0219950 | A1 | 11/2004 | Pallonen et al. |
| 2005/0147067 | A1 | 7/2005 | Mani et al. |
| 2005/0201323 | A1 | 9/2005 | Mani et al. |
| 2005/0250503 | A1 | 11/2005 | Cutrer |
| 2006/0026017 | A1 * | 2/2006 | Walker ............................ 705/1 |
| 2006/0066484 | A1 | 3/2006 | Sayers |
| 2006/0094470 | A1 * | 5/2006 | Wake et al. ............... 455/562.1 |
| 2006/0121944 | A1 | 6/2006 | Buscaglia et al. |
| 2006/0153070 | A1 | 7/2006 | DelRegno et al. |
| 2006/0172775 | A1 | 8/2006 | Conyers et al. |
| 2006/0193295 | A1 | 8/2006 | White et al. |
| 2007/0008939 | A1 | 1/2007 | Fischer |
| 2009/0316608 | A1 | 12/2009 | Singh et al. |
| 2009/0316611 | A1 | 12/2009 | Stratford et al. |
| 2010/0215028 | A1 | 8/2010 | Fischer |
| 2011/0143649 | A1 | 6/2011 | Sabat, Jr. et al. |
| 2012/0027145 | A1 | 2/2012 | Uyehara et al. |

FOREIGN PATENT DOCUMENTS

| | | |
|---|---|---|
| CA | 2069462 | 7/1993 |
| CA | 2087285 | 1/1994 |
| CA | 2138763 | 1/1994 |
| CA | 2156046 | 1/1995 |
| CA | 2125411 | 5/1995 |
| CA | 2128842 | 1/1996 |
| CA | 2134365 | 4/1996 |
| CA | 2158386 | 3/1997 |
| CA | 2168681 | 8/1997 |
| CA | 2215079 | 3/1999 |
| EP | 0391597 | 10/1990 |
| EP | 0876073 | 11/1998 |
| EP | 1214809 | 3/2006 |
| GB | 2253770 | 9/1992 |
| GB | 2289198 | 11/1995 |
| GB | 2315959 | 2/1998 |
| GB | 2320653 | 6/1998 |
| JP | 2000333240 | 11/2000 |
| JP | 2001197012 | 7/2001 |
| JP | 2003023396 | 1/2003 |
| JP | 2004180220 | 6/2004 |
| JP | 2004194351 | 7/2004 |
| WO | 9115927 | 10/1991 |
| WO | 9413067 | 6/1994 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0117156 | 3/2001 |
| WO | 0174013 | 10/2001 |
| WO | 0174100 | 10/2001 |
| WO | 0182642 | 11/2001 |

(56) References Cited

FOREIGN PATENT DOCUMENTS

| WO | 03079645 | 9/2003 |
|---|---|---|
| WO | 2009138876 | 11/2009 |
| WO | 2009155602 | 12/2009 |

OTHER PUBLICATIONS

U.S. Patent and Trademark Office, "Notice of Allowance", "U.S. Appl. No. 12/845,060", Mar. 4, 2013, pp. 1-10.
U.S. Patent and Trademark Office, "Corrected Notice of Allowability and Interview Summary", "U.S. Appl. No. 12/845,060", Mar. 28, 2013, pp. 1-25.
U.S. Patent and Trademark Office, "Office Action", "U.S. Appl. No. 12/845,060", Oct. 2, 2012, pp. 1-28.
International Preliminary Examining Authority, "International Preliminary Report on Patentability", "from Foreign Counterpart of U.S. Appl. No. 12/845,060", Feb. 7, 2013, pp. 1-6, Published in: WO.
International Searching Authority, "International Search Report", "from Foreign Counterpart of U.S. Appl. No. 12/845,060", Feb. 17, 2012, pp. 1-9, Published in: WO.
International Preliminary Examining Authority, "International Preliminary Report on Patentability", "from Foreign Counterpart of U.S. Appl. No. 12/913,179", May 10, 2013, pp. 1-7, Published in: WO.
U.S. Patent and Trademark Office, "Office Action", "U.S. Appl. No. 12/913,179", Mar. 18, 2013, pp. 1-49.
International Searching Authority, "International Search Report and Written Opinion", "from Foreign Counterpart of U.S. Appl. No. 12/913,179", Feb. 17, 2012, pp. 1-10, Published in: WO.
Chinese Patent Office, "Notification to Grant Patent Right for Invention", "from Foreign Counterpart of U.S. Appl. No. 11/150,820", Mar. 2, 2012, pp. 1-4, Published in: CN.
Chinese Patent Office, "First Office Action", "from Foreign Counterpart of U.S. Appl. No. 11/150,820", Oct. 9, 2010, pp. 1-33, Published in: CN.
Chinese Patent Office, "Second Office Action", "from Foreign Counterpart of U.S. Appl. No. 11/150,820", Aug. 10, 2011, pp. 1-31, Published in: CN.
Chinese Patent Office, "Third Office Action", "from Foreign Counterpart of U.S. Appl. No. 11/150,820", Nov. 16, 2011, pp. 1-10, Published in: CN.
European Patent Office, "Communication under Rule 71(3) EPC", "from Foreign Counterpart of U.S. Appl. No. 11/150,820", Sep. 13, 2012, pp. 1-40.
European Patent Office, "Office Action", "from Foreign Counterpart of U.S. Appl. No. 11/150,820", Apr. 14, 2008, pp. 1-7, Published in: EP.
European Patent Office, "Office Action", "from Foreign Counterpart of U.S. Appl. No. 11/150,820", Oct. 5, 2009, pp. 1-3, Published in: EP.
European Patent Office, "Office Action", "from Foreign Counterpart of U.S. Appl. No. 11/150,820", Nov. 12, 2010, pp. 1-5, Published in: EP.
European Patent Office, "Office Action", "from Foreign Counterpart of U.S. Appl. No. 11/150,820", Nov. 3, 2011, pp. 1-3, Published in: EP.
Japan Patent Office, "Notification of Reasons for Rejection", "from Foreign Counterpart of U.S. Appl. No. 11/150,820", Nov. 1, 2011, pp. 1-10, Published in: JP.
Japan Patent Office, "Decision of Final Rejection", "from Foreign Counterpart of U.S. Appl. No. 11/150,820", Feb. 28, 2012, pp. 1-5, Published in: JP.
Korean Patent Office, "Office Action", "from Foreign Counterpart of U.S. Appl. No. 11/150,820", Sep. 17, 2012, pp. 1-5, Published in: KR.
U.S. Patent and Trademark Office, "Decision on Appeal", "U.S. Appl. No. 11/150,820", Nov. 19, 2012, pp. 1-6.
U.S. Patent and Trademark Office, "Examiner's Answer", "U.S. Appl. No. 11/150,820", Nov. 17, 2009, pp. 1-24.
U.S. Patent and Trademark Office, "Final Office Action", "U.S. Appl. No. 11/150,820", Sep. 27, 2007, pp. 1-25.
U.S. Patent and Trademark Office, "Final Office Action", "U.S. Appl. No. 11/150,820", Dec. 29, 2008, pp. 1-27.
U.S. Patent and Trademark Office, "Office Action", "U.S. Appl. No. 11/150,820", Mar. 16, 2007, pp. 1-21.
U.S. Patent and Trademark Office, "Office Action", "U.S. Appl. No. 11/150,820", Mar. 24, 2008, pp. 1-17.
U.S. Patent and Trademark Office, "Examiner's Answer", "U.S. Appl. No. 12/775,897", Jan. 4, 2013, pp. 1-30.
U.S. Patent and Trademark Office, "Final Office Action", "U.S. Appl. No. 12/775,897", May 7, 2012, pp. 1-26.
U.S. Patent and Trademark Office, "Office Action", "U.S. Appl. No. 12/775,897", Dec. 28, 2011, pp. 1-29.
U.S. Patent and Trademark Office, "Pre-Appeal Brief Decision", "U.S. Appl. No. 12/775,897", Sep. 18, 2012, pp. 1-2.
International Preliminary Examining Authority, "International Preliminary Report on Patentability", "from Foreign Counterpart of U.S. Appl. No. 11/150,820", Dec. 27, 2007, pp. 1-9, Published in: WO.
International Searching Authority, "International Search Report", "from Foreign Counterpart of U.S. Appl. No. 11/150,820", Nov. 7, 2006, pp. 1-13, Published in: WO.
"DigivanceTM, Indoor Coverage Solution", "www.adc.com", 2001, pp. 1-8, Publisher: ADC.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
"Tektronix Synchronous Optical Network (Sonet)", "http://www.iec.org/online/tutorials/sonet/topic03.html", Aug. 28, 2002, Publisher: International Engineering Consortium.
U.S. Patent and Trademark Office, "Final Office Action", from U.S. Appl. No. 11/150,820, Feb. 6, 2014, pp. 1-20, Published in: US.

\* cited by examiner

DISTRIBUTED DIGITAL REFERENCE CLOCK

CROSS-REFERENCE TO RELATED APPLICATIONS

The present application is a continuation application of U.S. patent application Ser. No. 12/845,060 (hereafter "the '060 Application") entitled "DISTRIBUTED DIGITAL REFERENCE CLOCK", filed on Jul. 28, 2010 (currently pending). The present application is also related to commonly assigned and co-pending U.S. patent application Ser. No. 11/150,820 (hereafter "the '820 Application") entitled "PROVIDING WIRELESS COVERAGE INTO SUBSTANTIALLY CLOSED ENVIRONMENTS", filed on Jun. 10, 2005 (currently pending). The present application is also related to commonly assigned and co-pending U.S. patent application Ser. No. 12/775,897 (hereafter "the '897 Application") entitled "PROVIDING WIRELESS COVERAGE INTO SUBSTANTIALLY CLOSED ENVIRONMENTS", filed on May 7, 2010 (currently pending). The '060 Application, '820 Application, and the '897 Application are incorporated herein by reference in their entirety.

BACKGROUND

Distributed Antenna Systems (DAS) are used to distribute wireless signal coverage into buildings or other substantially closed environments. For example, a DAS may distribute antennas within a building. The antennas are typically connected to a radio frequency (RF) signal source, such as a service provider. Various methods of transporting the RF signal from the RF signal source to the antennas have been implemented in the art.

SUMMARY

A communication system includes a master host unit, a hybrid expansion unit coupled to the master host unit by a communication link, and a remote antenna unit coupled to the hybrid expansion unit by an analog communication medium. The master host unit is adapted to communicate analog signals with service provider interfaces using a first set of bands of analog spectrum. The master host unit and the hybrid expansion unit are adapted to communicate N-bit words of digitized spectrum over the communication link. The hybrid expansion unit is further adapted to convert between the N-bit words of digitized spectrum and a second set of bands of analog spectrum. The hybrid expansion unit and the remote antenna unit are adapted to communicate the second set of bands of analog spectrum over the analog communication medium. The remote antenna unit is further adapted to transmit and receive wireless signals over air interfaces. The master host unit includes a master clock distribution unit. The master clock distribution unit is adapted to generate a digital master reference clock signal. The master host unit is further adapted to communicate the digital master reference clock signal over the communication link. The hybrid expansion unit is further adapted to receive the digital master reference clock signal from the master host unit over the communication link. The hybrid expansion unit is further adapted to generate an analog reference clock signal based on the digital master reference clock signal. The hybrid expansion unit is further adapted to send the analog reference clock signal across the analog communication medium. The remote antenna unit is further adapted to receive the analog reference clock signal across the analog communication medium.

DETAILED DESCRIPTION

Figure 1:
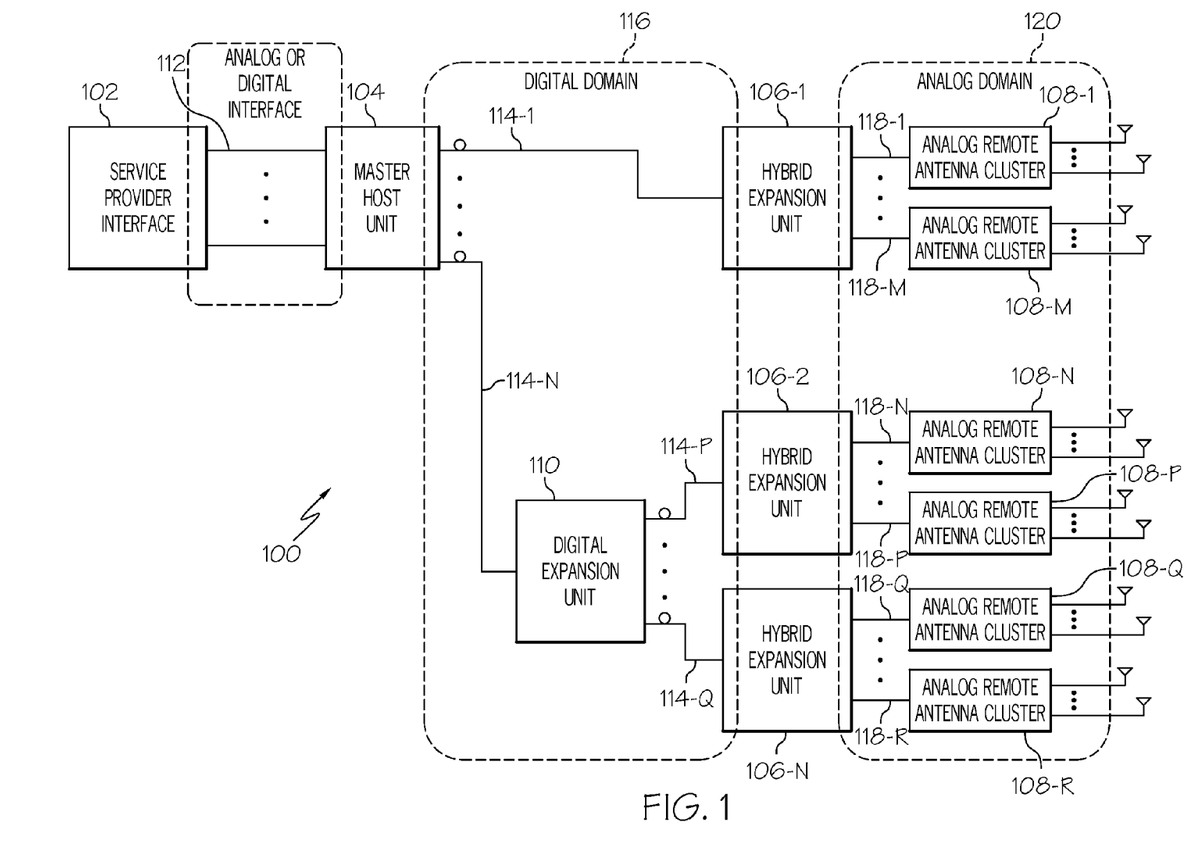
FIG. 1 is a block diagram of one embodiment of a system for providing wireless coverage into a substantially enclosed environment.

FIG. 1 is block diagram of one embodiment of a system 100 for providing wireless coverage into a substantially enclosed environment. The system 100 includes at least one service provider interface 102, at least one master host unit (MHU) 104, at least one hybrid expansion unit (HEU) 106, and at least one analog remote antenna cluster (ARAC) 108. Specifically, example system 100 includes hybrid expansion unit 106-1 and hybrid expansion unit 106-2 though hybrid expansion unit 106-N. In addition, example system 100 includes analog remote antenna clusters 108-1 through 108-M, 108-N through 108-P, and 108-Q through 108-R. Example system 100 also includes at least one digital expansion unit (DEU) 110. Other example systems include greater or fewer service provider interfaces 102, master host units 104, hybrid expansion units 106, analog remote antenna clusters 108, and digital expansion units 110.

Service provider interface 102 may include an interface to one or more of a base transceiver station (BTS), a repeater, a bi-directional amplifier, a base station hotel or other appropriate interface for one or more service provider networks. In one embodiment, service provider interface 102 provides an interface to a plurality of services from one or more service providers. The services may operate using various wireless protocols and in various bands of frequency spectrum. For example, the services may include, but are not limited to, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC Single Input Single Output (SISO) and Multiple Input Multiple Output (MIMO) services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), or other appropriate communication services.

In system 100, service provider interface 102 is connected to master host unit 104 over at least one analog communication link 112. Each analog communication link 112 includes two analog communication media, such as coaxial cables or fiber optic cables. One analog communication media is for downstream communication and the other is for upstream communication. The downstream and upstream analog communication media have been shown as a single analog communication link 112 for simplicity. In other embodiments, each analog communication link 112 only includes a single physical media, which is used to carry both the downlink and uplink streams between the service provider interface 102 and the master host unit 104.

The master host unit 104 receives downstream bands of radio frequency (RF) spectrum from the at least one service provider interface 102 over the at least one analog communication link 112. In addition, the master host unit 104 sends upstream bands of radio frequency (RF) spectrum to the at least one service provider interface 102 over the at least one analog communication link 112. In other embodiments, the service provider interface 102 and the master host unit 104 are connected over at least one digital communication link using at least one digital communication media. In some embodiments, separate analog communications links 112 are used for each service provider interface 102. Thus, while this disclosure describes at least one analog communication link 112, the format of this interface is not essential to operation of system 100. If an analog interface is used, the master host unit 104 converts the analog signal to a digital format as described below. If a digital interface is used, the master host unit 104 will either communicate the digital data as is or reformat the data into a representation that can be used for transport within the digital domain 116 described below. In example embodiments using a single physical medium for each analog communication link 112, frequency division multiplexing (FDM), time division multiplexing (TDM), and optical wavelength division multiplexing (WDM) are used to achieve a duplex connection over the single medium.

System 100 uses both digital and analog transport to extend the coverage of the wireless services into the substantially enclosed environment. First, system 100 uses digital transport over at least one digital communication link 114 to transport digitized RF spectrum between the master host unit 104 and the at least one hybrid expansion unit 106 and between the master host unit 104 and the at least one digital expansion unit 110. Each digital communication link 114 includes two digital communication media, such as fiber optic cables. One digital communication medium is for downstream communication and the other is for upstream communication. The downstream and upstream digital communication media have been shown as a single digital communication link 114 for simplicity. The areas of digital transport are called the digital domain 116. In other implementations, digital transport can be used to transport between other components as well and the digital domain 116 is more expansive. In other embodiments, each digital communication link 114 only includes a single physical media, which is used to carry both the downlink and uplink streams between the master host unit 104 and the at least one digital expansion unit 110. In example embodiments using a single physical media for each digital communication link 114, optical multiplexing techniques (i.e., wavelength division multiplexing (WDM), coarse wavelength division multiplexing (CWDM), or dense wavelength division multiplexing (DWDM)) are used to achieve a duplex connection over the single medium.

While an optical fiber is used in the example system 100, other appropriate communication media can also be used for the digital transport. For example, other embodiments use free space optics, high speed copper or other wired, wireless, or optical communication media for digital transport instead of the optical fibers used in each of the at least one digital communication link 114. By using digital transport over the at least one digital communication link 114, the bands of RF spectrum provided by the service provider interface 102 can be transported over long distances with minimal errors and more resiliency and robustness to signal loss and distortion of the physical medium. Thus, system 100 may extend coverage for wireless services to buildings located significant distances from the service provider interface 102.

Second, system 100 uses analog transport over at least one analog communication link 118 between the at least one hybrid expansion unit 106 and the at least one analog remote antenna cluster 108 to extend the reach of the digital transport into the substantially enclosed environment. Each analog communication link 118 includes two analog communication media, such as coaxial cable. One analog communication media is for downstream communication and the other is for upstream communication. The downstream and upstream analog communication media have been shown as a single analog communication link 118 for simplicity. While coaxial cable is used in the example system 100, other appropriate communication media can also be used for the analog transport. The areas of analog transport are called the analog domain 120. In other implementations, analog transport can be used to transport between other components as well and the analog domain 120 is more expansive. In other embodiments, each analog communication link 118 only includes a single physical medium, which is used to carry both the downlink and uplink streams between each hybrid expansion unit 106 and each analog remote antenna cluster 108. In example embodiments using a single physical medium for each analog communication link 118, frequency division multiplexing (FDM), time division multiplexing (TDM), and optical wavelength division multiplexing (WDM) are used to achieve a duplex connection over the single medium.

As discussed in further detail below, the various components of system 100 convert the various bands of RF spectrum between radio frequencies (RF), various intermediate frequencies (IF), digitized bands of RF spectrum, and digitized IF. As baseband representations of the signals can also be used, the invention can be generalized to convert between analog and digital signals. These various conversions require that the digital domain 116 and the analog domain 120 be synchronized in time and frequency. Time synchronization is important to the sampling and reconstruction of the signals. Time synchronization is also important when time alignment of signals in the various parallel branches of the system is necessary. Frequency synchronization is important to maintaining the absolute frequency of the signals at the external interfaces of the system. In order to synchronize the digital domain 116 and the analog domain 120, a common reference clock is distributed throughout both the digital domain 116 and the analog domain 120 as described in detail below. This common clock allows for accurate conversion and recovery between RF, IF, digitized bands of RF spectrum, and digitized IF, or more broadly between analog spectrum and digital spectrum.

Figure 2:
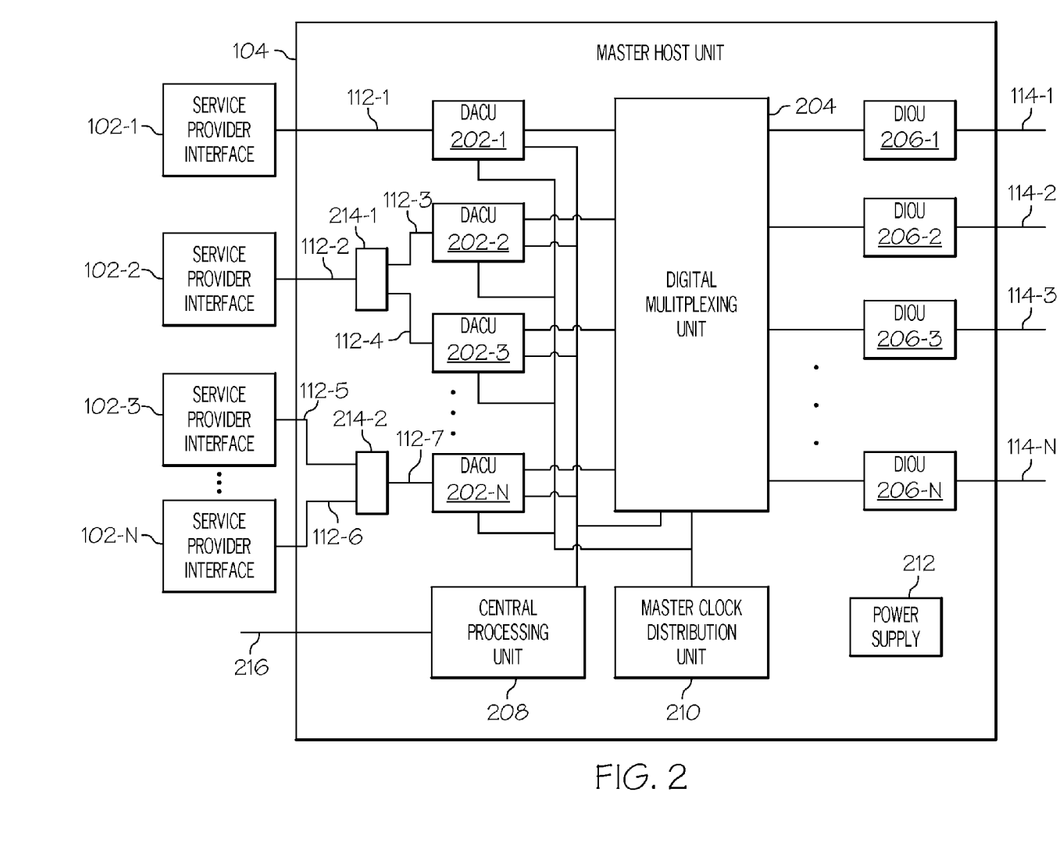
FIG. 2 is a block diagram of one embodiment of a master host unit for the system of FIG. 1.

FIG. 2 is a block diagram of one embodiment of the Master host unit 104 of system 100. Master host unit 104 includes at least one digital-analog conversion unit (DACU) 202, at least one digital multiplexing unit (DMU) 204, at least one digital input-output unit (DIOU) 206, at least one central processing unit (CPU) 208, at least one master clock distribution unit (MCDU) 210, and at least one power supply 212. In addition, the example master host unit 104 also includes at least one splitter/combiner 214.

The master host unit 104 communicates at least one band of analog spectrum with the at least one service provider interface 102. In the example system 100, there are a plurality of service provider interfaces 102-1, 102-2, 102-3, through 102-N. In addition, there are a plurality of DACUs 202-1, 202-2, 202-3, through 202-N. Each DACU 202 is coupled with at least one service provider interface 102. These couplings may be accomplished in various ways. For example, service provider interface 102-1 is directly coupled to DACU 202-1 through analog communication link 112-1. In contrast, service provider interface 102-2 is coupled to a first side of splitter/combiner 214-1 through analog communication link 112-2, DACU 202-2 is coupled to a second side of splitter/combiner 214-1 through analog communication link 112-3, and DACU 202-3 is coupled to the second side of splitter/combiner 214-1 through analog communication link 112-4. In addition, service provider interface 102-3 is coupled to a first side of splitter/combiner 214-2 through analog communication link 112-5, service provider interface 102-N is coupled to the first side of splitter/combiner 214-2 through analog communication link 112-6, and DACU 202-N is coupled to a second side of splitter/combiner 214-2 through analog communication link 112-7. As noted above, each analog communication link 112 of system 100 represents two analog media, one for downstream communication and one for upstream communication. In other embodiments, each link includes greater or fewer analog medium. In other embodiments, the master host unit communicates at least one band of digital spectrum with at least one service provider interface across at least one digital communication link using digital data or digitized spectrum. In these embodiments, the signals from the service provider interfaces 102-1, 102-2, 102-3, through 102-N are first converted from analog to digital before being transmitted across the at least one digital communication link to the master host unit 104.

Each DACU 202 operates to convert between at least one band of analog spectrum and N-bit words of digitized spectrum. In some embodiments, each DACU 202 is implemented with a Digital/Analog Radio Transceiver (DART board) commercially available from ADC Telecommunications, Inc. of Eden Prairie, Minn. as part of the FlexWave™ Prism line of products. The DART board is also described in U.S. patent application Ser. No. 11/627,251, assigned to ADC Telecommunications, Inc., published in U.S. Patent Application Publication No. 2008/0181282, and incorporated herein by reference. In some implementations, this occurs in stages, such that the analog spectrum is first converted to an IF frequency and subsequently converted to N-bit words of digitized spectrum. The bands of analog spectrum include signals in the frequency spectrum used to transport a wireless service, such as any of the wireless services described above. In some embodiments, master host unit 104 enables the aggregation and transmission of a plurality of services to a plurality of buildings or other structures so as to extend the wireless coverage of multiple services into the structures with a single platform.

The DMU 204 multiplexes N-bit words of digitized spectrum received from a plurality of DACU 202 (DACU 202-1 through DACU 202-N) and outputs at least one multiplexed signal to at least one DIOU 206 (DIOU 206-1 through DIOU 206-N). The DMU 204 also demultiplexes at least one multiplexed signal received from at least one DIOU 206 and outputs demultiplexed N-bit words of digitized spectrum to a plurality of DACU 202. In some embodiments, each DMU 204 is implemented with a Serialized RF (SeRF board) commercially available from ADC Telecommunications, Inc. of Eden Prairie, Minn. as part of the FlexWave™ Prism line of products. The SeRF board is also described in U.S. patent application Ser. No. 11/627,251, assigned to ADC Telecommunications, Inc., published in U.S. Patent Application Publication No. 2008/0181282, and incorporated herein by reference.

Each DIOU 206 communicates at least one digitized multiplexed signal across at least one digital communication link 114 (digital communication link 114-1 through digital communication link 114-N) using digital transport. The digitized multiplexed signal communicated across the digital communication link 114 includes N-bit words of digitized spectrum. Each DIOU 206 also receives at least one digitized multiplexed signal from the at least one digital communication link 114 using digital transport and sends the at least one digitized multiplexed signal to the DMU 204. In system 100 shown in FIG. 1, the digital communication link 114-1 is connected to hybrid expansion unit 106-1 and digital communication link 114-N is connected to digital expansion unit 110. DIOU 206-1 communicates using digital transport with hybrid expansion unit 106-1 and DIOU 206-N communicates using digital transport with digital expansion unit 110. As noted above, each digital communication link 114 represents two digital media, one for downstream communication and one for upstream communication. In addition to carrying the digitized multiplexed signals, the digital communication link 114 is also used to communicate other types of information such as system management information, control information, configuration information and telemetry information. The hybrid expansion unit 106 and digital expansion unit 110 are described in detail below.

Each DACU 202 and DMU 204 is synchronized with the other components of master host unit 104 and system 100 generally. Master clock distribution unit 210 generates a digital master reference clock signal. This signal is generated using any stable oscillator, such as a temperature compensated crystal oscillator (TCXO), an oven controlled crystal oscillator (OCXO), or a voltage controlled crystal oscillator (VCXO). In the embodiment shown in FIG. 2, the stable oscillator is included in the master clock distribution unit 210. In other embodiments, a reference clock external to the master host unit is used, such as a clock from a base station, a GPS unit, or a cesium atomic clock. In embodiments where digital data is communicated between service provider interface 102 and master host unit 104, the master clock distribution unit 210 may derive the reference clock signal from the digital data stream itself or an external clock signal may be used.

The digital master reference clock signal is supplied to each DACU 202 and each DMU 204 in the master host unit 104. Each DACU 202 uses the clock to convert between at least one band of analog spectrum and N-bit words of digitized spectrum. The DMU 204 uses the clock to multiplex the various streams of N-bit words of digitized spectrum together and outputs the multiplexed signal to each DIOU 206. Thus, the downstream digital data streams output by each DIOU 206 are synchronized to the digital master reference clock signal. Thus, through the clocking of the downstream digital data streams, the digital master reference clock signal is distributed to each hybrid expansion unit 106 and each digital expansion unit 110 through each corresponding digital communication link 114.

CPU 208 is used to control each DACU 202 and each DMU 204. An input/output (I/O) line 216 coupled to CPU 208 is used for network monitoring and maintenance. Typically, I/O line 216 is an Ethernet port used for external communication with the system. Other communication protocols such as Universal Serial Bus (USB), IEEE 1394 (FireWire), and serial may also be used. Power supply 212 is used to power various components within master host unit 104.

Figure 3:
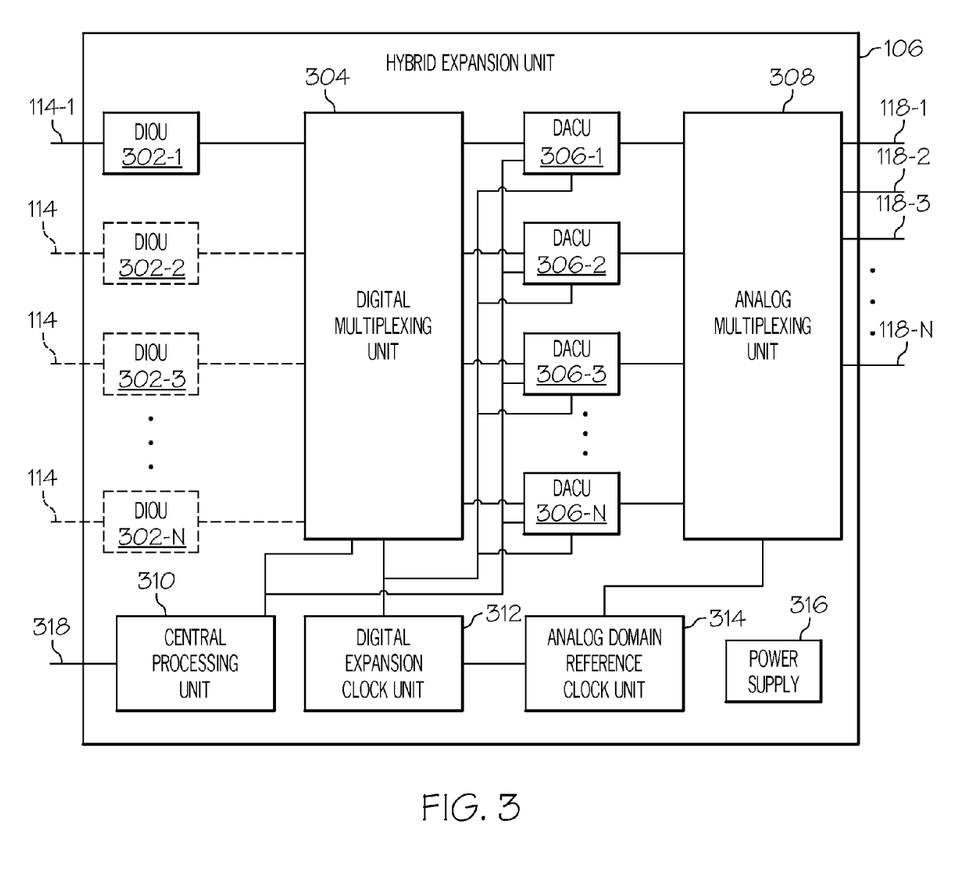
FIG. 3 is a block diagram of one embodiment of a hybrid expansion unit for the system of FIG. 1.

FIG. 3 is a block diagram of one embodiment of a hybrid expansion unit 106 of system 100. Hybrid expansion unit 106 of system 100 includes at least one digital input-output unit (DIOU) 302, at least one digital multiplexing unit (DMU) 304, at least one digital-analog conversion unit (DACU) 306, at least one analog multiplexing unit (AMU) 308, at least one central processing unit (CPU) 310, at least one digital expansion clock unit (DECU) 312, at least one analog domain reference clock unit (ADRCU) 314, and at least one power supply 316.

Each hybrid expansion unit 106 communicates at least one band of digitized spectrum with the master host unit 104 in the form of a multiplexed digitized signal containing N-bit words of digitized spectrum. The multiplexed digitized signal is received at the at least one DIOU 302 through at least one digital communication link 114. In the embodiment shown in FIG. 3, only one DIOU 302-1 is necessary if the hybrid expansion unit 106 is only coupled with a single upstream master host unit 104 (or single upstream digital expansion unit 110 as described in detail below). DIOU 302-2 through DIOU 302-N are optional. For example, in other embodiments, hybrid expansion unit 106 has multiple DIOUs 302 (DIOU 302-1 through DIOU 302-N) and is connected to multiple upstream master host units 104 or digital expansion units 110 through digital communication links 114. In other embodiments, hybrid expansion unit 106 is connected to other hybrid expansion units through DIOU 302. In some embodiments including multiple upstream connections, the hybrid expansion unit 106 selects one DIOU 302 to extract the clock signal from.

The at least one DIOU 302 communicates the multiplexed digitized signal containing N-bit words of digitized spectrum to the DMU 304. The DMU 304 demultiplexes N-bit words of digitized spectrum received from the at least one DIOU 302 and sends N-bit words of digitized spectrum to the at least one DACU 306. The at least one DACU 306 converts the N-bit words of digitized spectrum to at least one band of analog spectrum. In some embodiments, the at least one DACU 306 converts the digitized signal back to the original analog frequency provided by the at least one service provider interface 102. In other embodiments, the at least one DACU 306 converts the digitized signal to an intermediate frequency (IF) for transport across the at least one analog communication link 118. In other embodiments, other components are included in the hybrid expansion unit 106 that frequency convert at least one band of analog spectrum output by the DACU 306 into an intermediate frequency for transport.

Each DACU 306 is coupled with the AMU 308. Each DACU 306 also converts at least one band of analog spectrum received from the AMU 308 into N-bit words of digitized spectrum. AMU 308 receives multiple bands of analog spectrum from multiple DACU 306 and multiplexes the bands of analog spectrum together into at least one multiplexed analog signal including multiple bands of analog spectrum. In some embodiments, there are a plurality of multiplexed analog signals output from the AMU 308. In some embodiments, all of the bands of analog spectrum from each DACU 306 are included on each multiplexed signal output by AMU 308. In other embodiments, a subset of the bands of analog spectrum from a plurality of DACU 306 are multiplexed onto one signal output on one of the at least one analog communication link 118, while a different subset of bands of analog spectrum from a plurality of DACU 306 are multiplexed onto another signal output on another of the at least one analog communication link 118. In other embodiments, different combinations of bands of analog spectrum from various DACU 306 are multiplexed onto various analog communication links 118.

In some embodiments, each DACU 306 converts a band of digitized spectrum to a different analog frequency from the other DACU 306. Each band of analog spectrum is pre-assigned to a particular analog frequency. Then, the AMU 308 multiplexes the various pre-assigned analog frequencies together, in addition to the analog domain reference clock and any communication, control, or command signals and outputs them using at least one analog communication link 118. In other embodiments, each DACU 306 converts a band of analog spectrum to the same analog frequency as the other DACU 306. Then, the AMU 308 shifts the received signals into distinct analog frequencies and multiplexes them together and outputs them using at least one analog communication link 118. In the embodiment shown in FIG. 3, the AMU 308 multiplexes the analog frequencies received from each DACU 306 onto each analog communication link 118.

In other embodiments, bands of frequency spectrum from certain DACU 306 are selectively distributed to certain analog communication links 118. In one example embodiment, analog communication link 118-1 is coupled to analog remote antenna cluster 108-1 and only a first subset of bands of analog spectrum are transported using analog communication link 118-1. Further, analog communication link 118-2 is coupled to analog remote antenna cluster 108-2 and only a second subset of bands of analog spectrum are transported using analog communication link 118-2. In another embodiment, a first subset of bands of analog spectrum are transported to analog remote antenna cluster 108-1 using analog communication link 118-2 and a second subset of bands of analog spectrum are transported to the same remote cluster 108-1 using analog communication link 118-1. It is understood that these examples are not limiting and that other system hierarchies and structures are used in other embodiments.

Each DMU 304, DACU 306, and AMU 308 is synchronized with the other components of hybrid expansion unit 106 and system 100 generally. In the example embodiment shown in FIG. 3, DIOU 302-1 receives the data stream from a master host unit 104 via a digital communication link 114 in an optical format. DIOU 302-1 converts the data stream from the optical format to an electrical format and passes the data stream onto the DMU 304. The DMU 304 extracts the digital master reference clock signal from the data stream itself. Because the data stream was synchronized with the digital master reference clock signal at the master host unit 104, it can be recovered from the data stream itself. The extracted digital master reference clock signal is sent to the digital expansion clock unit 312. Each DIOU 302 is not required to be synchronized to the other parts of the hybrid expansion unit unless it performs some type of function that requires it to be synchronized. In one embodiment, the DIOU 302 performs the extraction of the digital master reference clock in which case it would be synchronized to the remainder of the hybrid expansion unit.

The digital expansion clock unit 312 receives the digital master reference clock signal extracted from the data stream received from the master host unit 104. The digital expansion clock unit 312 communicates the digital master reference clock signal to various components of the hybrid expansion unit 106, including the DMU 304 and each DACU 306. Each DMU 304 and DACU 306 uses the digital master reference clock signal to synchronize itself with the system 100. In other embodiments, the digital expansion clock unit 312 could receive a copy of the data stream from the DMU 304 and extract the digital master reference clock signal from the data stream itself. In some embodiments, each DIOU 302 is selectable and configurable, so that one DIOU 302 can be selected to receive the digital master reference clock signal and other DIOUs 302 can be used to send the digital master reference clock signal upstream to other system components, such as secondary master host units, digital expansion units, or other hybrid expansion units.

In addition, the digital expansion clock unit 312 distributes the digital master reference clock signal to the analog domain reference clock unit 314. The analog domain reference clock unit 314 in turn generates an analog domain reference clock signal based on the digital master reference clock signal. This analog domain reference clock signal is used to synchronize analog components in the hybrid expansion unit 106, such as analog frequency conversion functions in the AMU 308. In addition, the AMU multiplexes the analog domain reference clock signal onto the multiplexed signals sent on each analog communication link 118 to the at least one analog remote antenna cluster 108.

In the embodiment of hybrid expansion unit 106 shown in FIG. 3, the analog domain reference clock unit 314 generates the analog domain reference clock signal by running the digital master reference clock signal through a phase locked loop circuit. In some embodiments, the digital master reference clock signal is approximately 184.32 MHz and the analog domain reference clock signal is generated as a 30.72 MHz clock based on the 184.32 MHz digital master reference clock signal. Thus, the 30.72 MHz clock is multiplexed onto the multiplexed signals sent on each analog communication link 118 to at least one analog remote antenna cluster 108.

CPU 310 is used to control each DMU 304 and each DACU 306. An input/output (I/O) line 318 coupled to CPU 310 is used for network monitoring and maintenance. Typically, I/O line 318 is an Ethernet port used for external communication with the system. Power supply 316 is used to power various components within hybrid expansion unit 106.

In addition to performing the analog frequency conversion functions described above, the AMU 308 couples power onto the analog communication link 118. This power is then supplied through the analog communication link 118 to the downstream remote antenna cluster 108, including mater remote antenna unit 402 and slave remote antenna units 404-1 as described below. The power coupled onto the analog communication link 118 is supplied from the power supply 316. In the example embodiment shown, 28 volts DC is received by AMU 308 from the power supply 316 and is coupled to the analog communication link 118 by AMU 308.

Figure 4:
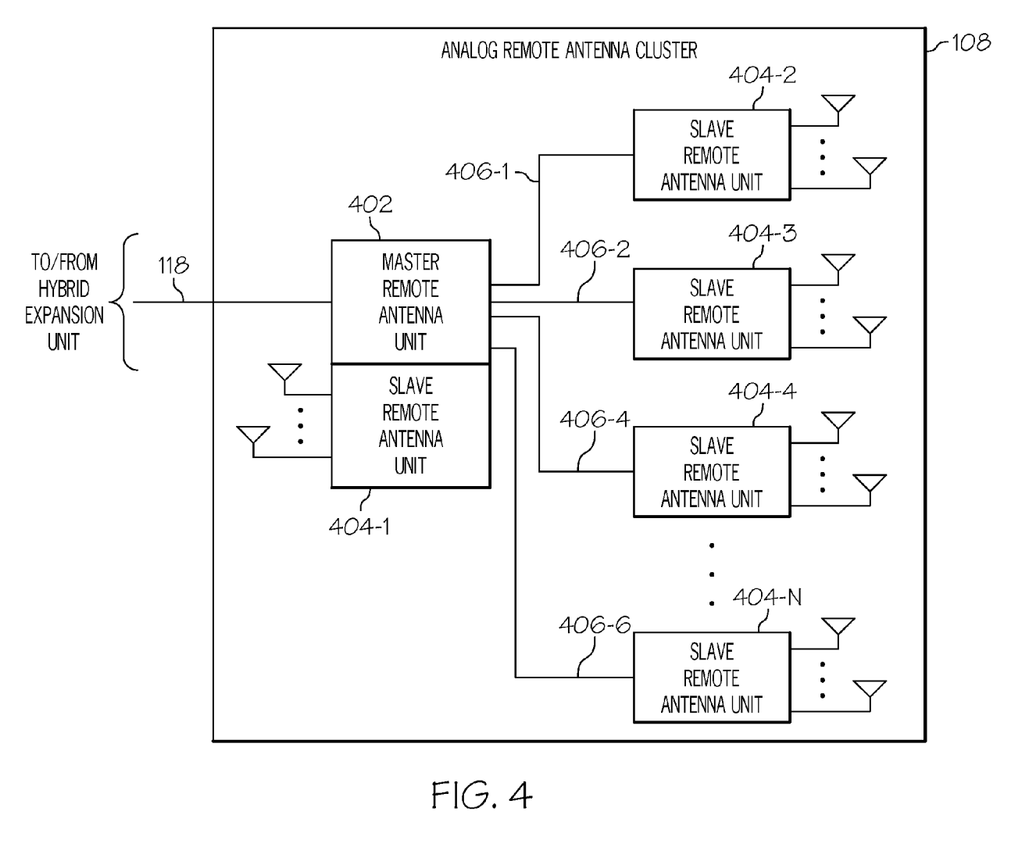
FIG. 4 is a block diagram of one embodiment of an analog remote antenna cluster for the system of FIG. 1.
Figure 5:
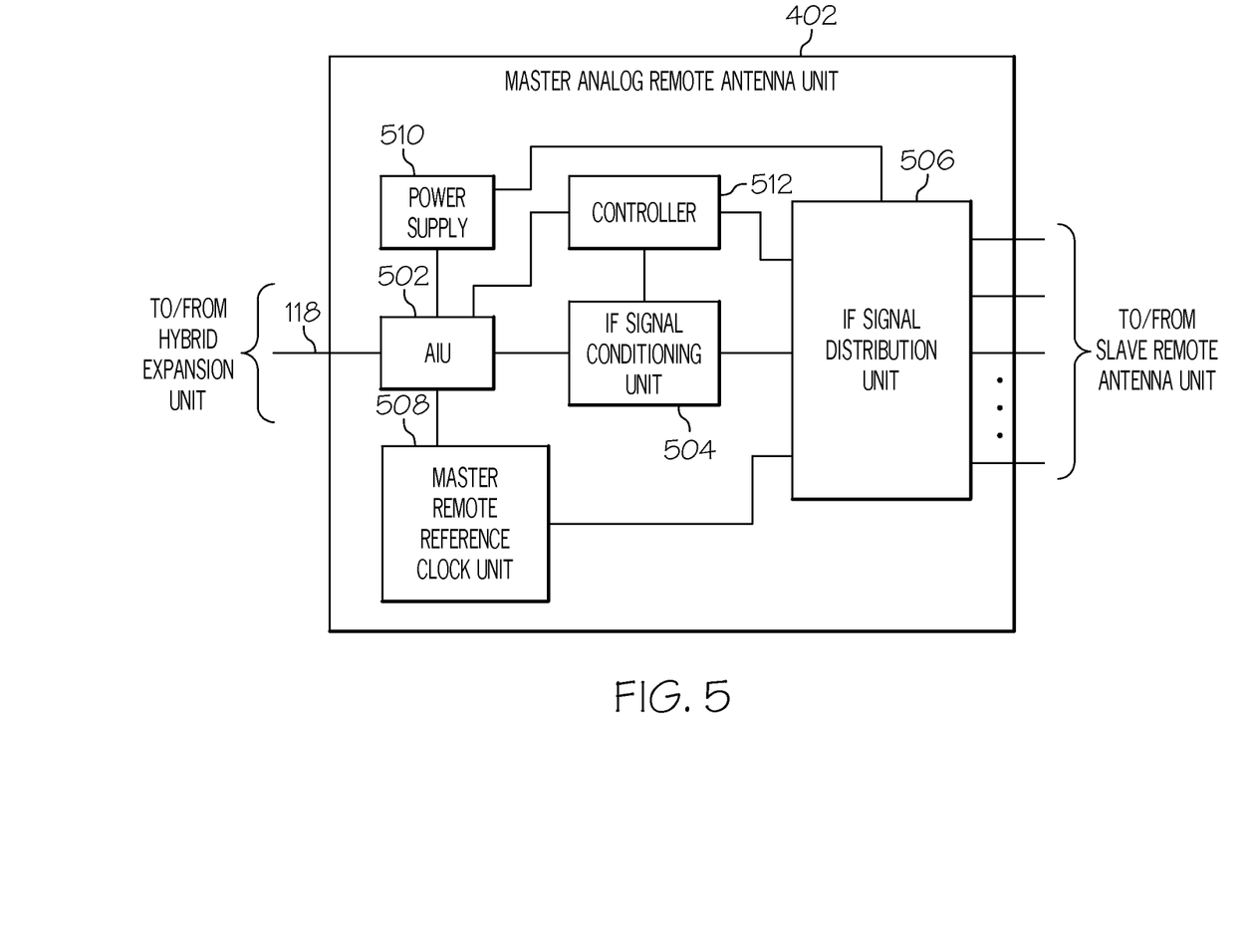
FIG. 5 is a block diagram of one embodiment of a master analog remote antenna unit for the analog remote antenna unit cluster of FIG. 4.
Figure 6:
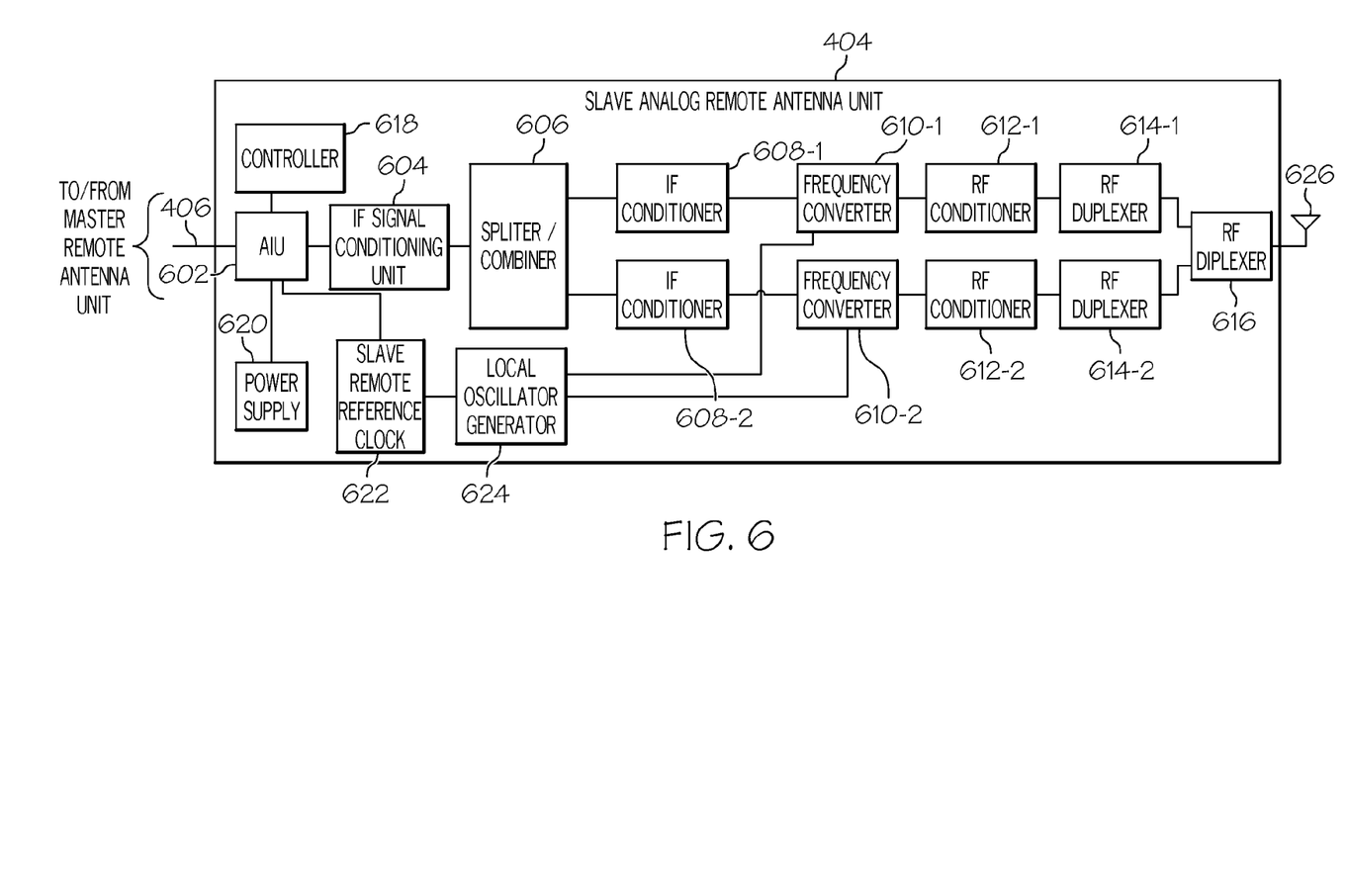
FIG. 6 is a block diagram of one embodiment of a slave analog remote antenna unit for the analog remote antenna unit cluster of FIG. 4.

In the embodiments described and depicted in FIGS. 4-6, the term analog intermediate frequency (IF) spectrum is used to describe the analog signals transported in the analog domain 120 between the hybrid expansion units 106 and the analog remote antenna clusters 108. The term analog IF spectrum is used to distinguish the signals from the analog RF spectrum format that is communicated to the service provider interface and the mobile devices over the air. Example system 100 uses analog IF spectrum for transport within the analog domain 120 that is lower in frequency than the analog RF spectrum. In other example embodiments, the RF spectrum can be transmitted at its native frequency within the analog domain 120 or using an analog IF spectrum that is higher in frequency than the analog RF spectrum.

FIG. 4 is a block diagram of one embodiment of an analog remote antenna cluster 108 for system 100. Analog remote antenna cluster 108 includes a master analog remote antenna unit 402 and a plurality of slave analog remote antenna units 404-1 through 404-N. In other embodiments, other configurations are used instead of this master/slave configuration.

In example analog remote antenna cluster 108, the master analog remote antenna unit 402 is coupled to at least one analog communication link 118. In the embodiment shown in FIG. 4, the at least one coaxial cable includes two coaxial cables. A first coaxial cable is used to transport downstream communication from a hybrid expansion unit 106 and the analog remote cluster 108, including the bands of downstream analog spectrum associated with the service providers. A second coaxial cable is used to transport upstream communication from the analog remote cluster 108 to the hybrid expansion unit 106, including the bands of upstream analog spectrum associated with the service providers. The downstream analog spectrum and the upstream analog spectrum are transported on separate coaxial cables in this example embodiment due to bandwidth limitations of the coaxial cable being used as media. In other example embodiments, a single analog communication link 118 is used to transport both the downstream and upstream analog spectrum. In other example embodiments, the at least one analog communication link 118 includes greater than two coaxial cables in order to transport even more bands. In other example embodiments, different media such as twisted pair (i.e., unshielded twisted pair (UTP) or screened unshielded twisted pair (ScTP)), CATV fibers, or optical fibers are used to transport the analog signals instead of coaxial cables.

In example analog remote antenna cluster 108, the master analog remote antenna unit 402 coordinates the distribution of various bands of analog RF spectrum to various slave analog remote antenna units 404 through analog communication links 406. The master analog remote antenna unit 402 is discussed in further detail below. In the example analog remote antenna cluster 108, each slave analog remote antenna unit 404-1 through 404-N receive at least one band of analog RF spectrum from the master remote antenna unit. Each slave analog remote antenna unit 404-1 through 404-N then transmits and receives the at least one band of analog RF spectrum wirelessly across an air medium using at least one antenna. The slave analog remote antenna unit 404 is discussed in further detail below.

FIG. 5 is a block diagram of one embodiment of a master analog remote antenna unit 402 from the analog remote antenna cluster 108. Master analog remote antenna unit 402 includes an analog interface unit (AIU) 502, an IF signal conditioning unit 504, an IF signal distribution unit 506, a master remote reference clock 508, a power supply 510, and a controller 512. Other example embodiments of master analog remote antenna unit include greater or fewer components.

The at least one analog communication link 118 is connected to the master analog remote antenna unit 402 through the AIU 502. One of the primary functions of the AIU is to handle any type of media conversion that may be necessary which in some embodiments may involve impedance transformation. Specifically, in the example embodiment shown in FIG. 5, the AIU 502 performs impedance conversion from the 75 ohms of the coaxial cables carrying the downstream and upstream bands of analog spectrum to the 50 ohms used within the master analog remote antenna unit 402. The AIU 502 also includes a coupler that is used to extract the DC power received from the hybrid expansion unit 106 across the at least one analog communication link 118.

In addition, the analog reference clock signal is extracted from the signal received from the hybrid expansion unit 106 across the at least one analog communication link 118. This analog reference clock signal is sent to the master remote reference clock unit 508. Any control signals received from the hybrid expansion unit 106 across the at least one analog communication link 118 are also extracted and sent to the controller 512.

Power supply 510 receives DC power from the AIU 502 and then generates the necessary DC power for operation of the various components onboard the master analog remote antenna unit 402. Thus, master analog remote antenna unit 402 does not need a separate power source other than the power that is received across the at least one analog communication link 118. In the example embodiment shown, 28 volts DC is extracted from the signal received across the at least one analog communication link 118 by the AIU 502. This 28 volts DC is then used by the power supply 510 to generate 5 volts DC and 12 volts DC to power the various devices in the master analog remote antenna unit. In addition, the power received across the analog communication link 118 is sent by the power supply 510 to the IF signal distribution unit 506 where it is coupled onto the analog communication links 406 that connect to each slave remote antenna unit 404 so that each slave remote antenna units 404 can also derive power from the cable instead of having a separate external power source. Thus, power for both the master analog remote antenna unit 402 and each slave analog remote antenna unit 404 is provided by the hybrid expansion unit 106 through the analog communication links 118 and 406.

As noted above, the AIU 502 extracts the clock signal and supplies it to the master remote reference clock unit 508. The master remote reference clock unit 508 refines the original clock signal received from the hybrid expansion unit 106 across the at least one analog communication link 118. In example embodiments, the master remote reference clock unit 508 processes the clock signal through a phase locked loop to refine the signal. In this way, noise, distortion, and other undesirable elements are removed from the reference clock signal. In other embodiments, the clock signal is processed through a filter to remove adjacent spurious signals. The refined signal output from the master remote reference clock unit 508 is sent to the IF signal distribution unit 506, where it is coupled onto the outputs of the IF signal distribution unit 506 that are connected to the slave analog remote antenna units 404. In this way, the master reference clock signal is redistributed by the master analog remote antenna unit 402 to all the slave analog remote antenna units 404.

IF signal conditioning unit 504 is configured to remove distortion in the analog IF signals that traverse the analog communication link 118. In the example master analog remote antenna unit 402 shown in FIG. 5, IF signal conditioning unit 504 performs cable equalization for signals sent and received across the at least one analog communication link 118. The at least one analog communication link 118 is generally quite long, causing the gain to vary as a function of frequency. IF signal conditioning unit 504 adjusts for gain at various frequencies to equalize the gain profile. IF signal conditioning unit 504 also performs filtering of the analog IF signals to remove adjacent interferers or spurious signals before the signals are propagated further through the system 100.

Controller 512 receives control signals from the AIU 502 that are received from hybrid expansion unit 106 across the at least one analog communication link 118. Controller 512 performs control management, monitoring, and can configure parameters for the various components of the master analog remote antenna unit 402. In the example master analog remote antenna unit 402, the controller 512 also drives the cable equalization algorithm.

IF signal distribution unit 506 is used to distribute the signals processed by the IF signal conditioning unit 504 to various slave analog remote antenna units 404 across analog communication links 406-1 through 406-N. In the example embodiment shown in FIG. 5, two bands are sent across each analog communication link 406 at two different analog IF frequencies. As noted above, the IF signal distribution unit 506 is also used to couple the DC power, the analog reference clock, and any other communication signals from the master analog remote antenna unit 402 onto analog communication link 406. The IF signal conditioning occurs at the IF signal conditioning unit 504 before the various analog signals are distributed at the IF signal distribution unit 506 in the embodiment shown in FIG. 5. In other embodiments, the IF signal conditioning could be done after the distribution of the analog signals.

FIG. 6 is a block diagram of one embodiment of a slave analog remote antenna unit 404 for the analog remote antenna unit cluster 108. The slave analog remote antenna unit 404 includes an analog interface unit (AIU) 602, an IF signal conditioning unit 604, a splitter/combiner 606, a plurality of IF conditioners 608, a plurality of frequency converters 610, a plurality of RF conditioners 612, a plurality of RF duplexers 614, and a RF diplexer 616. While the slave analog remote antenna unit 404 is described as a separate component, in some example embodiments, a slave analog remote antenna unit 404 is integrated with a master analog remote antenna unit 402.

The AIU 602 is connected to the analog communication link 406. The AIU 602 includes a coupler that is used to extract the DC power received from the master analog remote antenna unit 402 across the analog communication link 406. The AIU 602 passes the extracted DC power to the power supply 620. The power supply 620 in turn powers the various components of the slave analog remote antenna unit 404. The AIU 602 also extracts control signals received from the master analog remote antenna unit 402 across the analog communication link 406. The control signals are sent by the AIU 602 to the controller 618. The controller 618 uses the control signals to control various components of the slave analog remote antenna unit 404. In particular, the control signals are used by the controller 618 to control the gain in the IF signal conditioning unit 604. Adjustments may be made based on temperature changes and other dynamic factors. The control signals are also used for the configuration of the subsequent frequency conversion 610 and signal conditioning functions 608 and 612.

The AIU 602 also extracts the analog reference clock and sends it to the slave remote reference clock unit 622. In the embodiment shown in FIG. 6, the slave remote reference clock unit 622 refines the reference clock signal using a band pass filter. In other embodiments, the reference clock signal drives a phase locked loop to generate a refined reference clock signal. The slave remote reference clock unit 622 distributes the refined reference clock signal to the local oscillator generator 624, which generates local oscillator signals for the mixers used for frequency conversion. The local oscillator signals are generated using a phase locked loop. In the example shown in FIG. 6, the local oscillator generator 624 generates four local oscillator frequencies for each of the carrier signals of a first and second band. A first local oscillator frequency is used for downlink data in a first band and a second local oscillator frequency is used for the uplink data in the first band. A third local oscillator frequency is used for the downlink data in a second band and a fourth local oscillator frequency is used for the uplink data in the second band. In other example embodiments, greater or fewer bands are used and greater or fewer local oscillator signals are created by the local oscillator generator 624. For example, some embodiments may require diversity, so that two uplinks are needed for each downlink and three local oscillators would need to be generated for each band. In example embodiments, the AIU 602 is also used to impedance convert between the signal received on the analog communication link 406 and the signal processed by various components of the slave analog remote antenna unit 404.

Various analog spectrum received across the analog communication link 406 by the AIU 602 is passed to the IF signal conditioning unit 604. The IF signal conditioning unit 604 filters out noise, distortion, and other undesirable elements of the signal using amplification and filtering techniques. The IF signal conditioning unit passes the analog spectrum to the splitter/combiner 606, where the various bands are split out of the signal in the downlink and combined together in the uplink. In the downstream, a first band is split out and passed to the IF conditioner 608-1 and a second band is split out and passed to the IF conditioner 608-2. In the upstream, a first band is received from the IF conditioner 608-1, a second band is received from the IF conditioner 608-2, and the two upstream bands are combined by the splitter/combiner 606.

In the downstream for band A, IF conditioner 608-1 passes the IF signal for band A to the frequency converter 610-1. The frequency converter 610-1 receives a downstream mixing frequency for band A from local oscillator generator 624. The frequency converter 610-1 uses the downstream mixing frequency for band A to convert the downstream IF signal for band A to a downstream RF signal for band A. The downstream RF signal for band A is passed onto the RF conditioner 612-1, which performs RF gain adjustment and filtering on the downstream RF signal for band A. The RF conditioner 612-1 passes the downstream RF signal for band A to the RF duplexer 614-1, where the downstream RF signal for band A is combined onto the same medium with an upstream RF signal for band A. Finally, the RF diplexer 616 combines band A and band B together. Thus, both band A and band B are transmitted and received across an air medium using a single antenna 626. In other embodiments, multiple antennas are used. In one specific embodiment, the RF diplexer 616 is not necessary because band A and band B are transmitted and received using independent antennas. In other embodiments, the downstream signals are transmitted from one antenna and the upstream signals are received from another antenna. In embodiments with these types of alternative antenna configurations, the requirements and design of the RF duplexers 614 and the RF diplexers 616 will vary to meet the requirements of the antenna configuration.

In the downstream for band B, IF conditioner 608-2 passes the IF signal for band B to the frequency converter 610-2. The frequency converter 610-2 receives a downstream mixing frequency for band B from local oscillator generator 624. The frequency converter 610-2 uses the downstream mixing frequency for band B to convert the downstream IF signal for band B to a downstream RF signal for band B. The downstream RF signal for band B is passed onto the RF conditioner 612-2, which performs more RF adjustment and filtering on the downstream RF signal for band B. The RF conditioner 612-2 passes the downstream RF signal for band B to the RF duplexer 614-2, where the downstream RF signal for band B is combined onto the same medium with an upstream RF signal for band B. Finally, the RF diplexer 616 combines band A and band B together as described above, such that both band A and band B are transmitted and received across an air medium using antenna 626.

In the upstream, antenna 626 receives the RF signal for both band A and band B and passes both onto RF diplexer 616 which separates band A from band B. Then, band A is passed to RF duplexer 614-1, where the upstream RF and downstream RF signals for band A are separated onto different signal lines. The upstream RF signal for band A is then passed to the RF conditioner 612-1, which performs gain adjustment and filtering on the upstream RF signal for band A. Finally, the upstream RF signal for band A is passed to frequency converter 610-1, which frequency converts the upstream RF signal for band A into an upstream IF signal for band A using an upstream mixing frequency generated by the local oscillator generator 624.

In addition, band B is passed from the RF diplexer 616 to the RF duplexer 614-2, where the upstream RF and downstream RF signals for band B are separated onto different signal lines. The upstream RF signal for band B is then passed to the RF conditioner 612-1, which performs gain adjustment and filtering on the upstream RF signal for band B. Finally, the upstream RF signal for band B is passed to frequency converter 610-2, which frequency converts the upstream RF signal for band B into an upstream IF signal for band B using an upstream mixing frequency generated by the local oscillator generator 624.

In embodiments where the functions of the master remote antenna unit 402 and the slave remote antenna unit 404-1 are integrated into the same physical package, as depicted in FIG. 4, some of the redundant functions in the master remote antenna unit 402 and the slave remote antenna unit 404-1 may be removed. For example, the two units may share the same controller and power supply. The slave remote reference clock 622 may not be required as the signal from the master remote reference clock unit 508 could be routed directly to the local oscillator generator 624.

Figure 7:
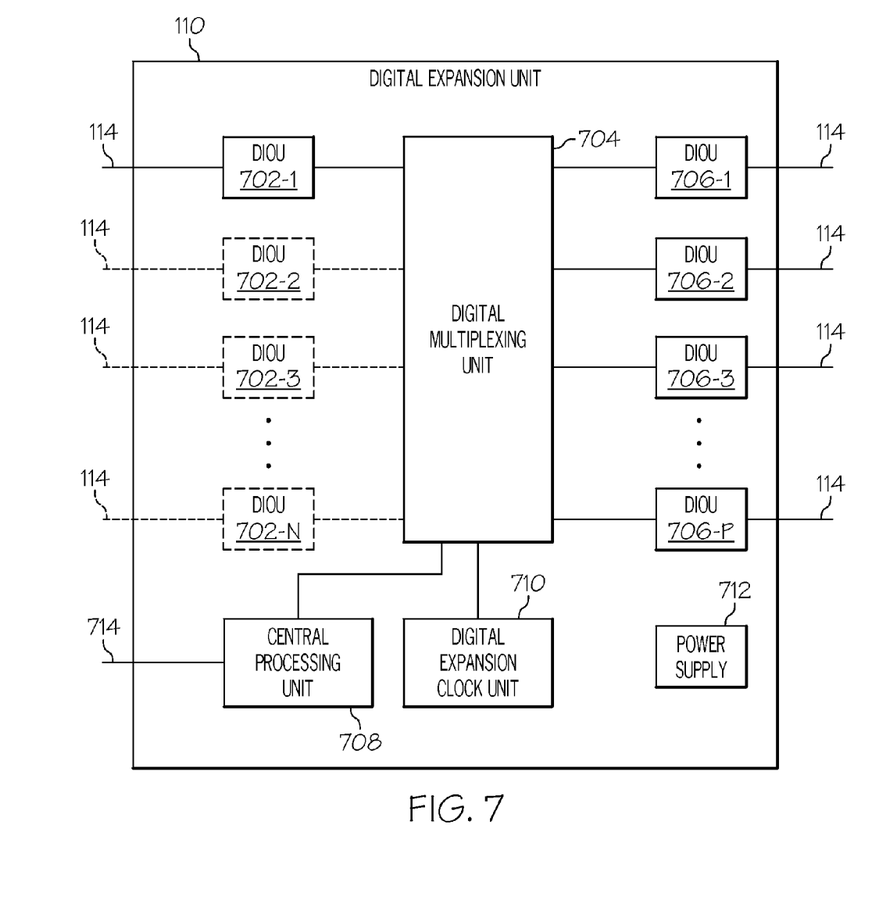
FIG. 7 is a block diagram of one embodiment of a digital expansion unit for the system of FIG. 1.

FIG. 7 is a block diagram of one embodiment of a digital expansion unit 110 of system 100. Digital expansion unit 110 includes at least one digital input-output unit (DIOU) 702, at least one digital multiplexing unit (DMU) 704, at least one digital input-output unit (DIOU) 706, at least one central processing unit (CPU) 708, at least one digital expansion clock unit 710, and at least one power supply 712.

The digital expansion unit 110 communicates N-bit words of digitized spectrum between the master host unit 104 and at least one hybrid expansion unit 106. Each DIOU 702 (DIOU 702-1 through DIOU 702-N) of the digital expansion unit 110 operates to convert between optical signals received across a digital communication link 114 and electrical signals processed within the digital expansion unit 110. In the downstream, the converted signals are passed from each DIOU 702 to the DMU 704, where they are multiplexed together and output to at least one DIOU 706 which converts the electrical signals to optical signals and outputs the optical signals to at least one hybrid expansion unit or another digital expansion unit for further distribution. In the upstream, each DIOU 706 converts optical signals received from a downstream hybrid expansion unit or digital expansion unit into electrical signals, which are passed onto the DMU 704. The DMU 704 takes the upstream signals and multiplexes them together and outputs them to at least one DIOU 702, which converts the electrical signals into optical signals and sends the optical signals across a digital communication link 114 toward the master host unit. In other embodiments, multiple digital expansion units are daisy chained for expansion in the digital domain.

In the example embodiment shown in FIG. 7, the CPU 708 is used to control each DMU 704. An input/output (I/O) line 714 coupled to CPU 708 is used for network monitoring and maintenance. Typically, I/O line 714 is an Ethernet port used for external communication with the system. The DMU 704 extracts the digital master reference clock signal from any one digital data stream received at any one of the DIOU 702 and DIOU 706 and sends the digital master reference clock signal to the digital expansion clock unit 710. The digital expansion clock unit 710 then provides the digital master reference clock signal to other functions in the DMU that require a clock signal. Power supply 712 is used to power various components within digital expansion unit 110.

What is claimed is:

1. A communication system, comprising:
    a master host unit adapted to communicate digital signals with a plurality of service provider interfaces, wherein the master host unit includes a master clock distribution unit that generates a digital master reference clock signal;
    a plurality of communication links coupled to the master host unit, wherein the master host unit is further adapted to communicate digitized spectrum in N-bit words over the plurality of communication links;
    the master host unit further adapted to interface between the digital signals for the plurality of service provider interfaces and N-bit words of digitized spectrum for the plurality of communication links;
    the master host unit further adapted to communicate the digital master reference clock signal over the plurality of communication links;
    at least one hybrid expansion unit, communicatively coupled to the master host unit over at least one of the plurality of communication links and adapted to communicate N-bit words of digitized spectrum with the master host unit across the at least one of the plurality of communication links, the at least one hybrid expansion unit further adapted to convert between the N-bit words of digitized spectrum and a first set of bands of analog spectrum;
    an analog communication medium coupled to the at least one hybrid expansion unit, wherein the at least one hybrid expansion unit is further adapted to communicate the first set of bands of analog spectrum across the analog communication medium;
    each hybrid expansion unit further adapted to:
        receive the digital master reference clock signal across one of the plurality of communication links;
        generate an analog reference clock signal based on the received digital master reference clock signal; and
        send the analog reference clock signal across the analog communication medium; and
    at least one remote antenna unit communicatively coupled to one of the at least one hybrid expansion units over the analog communication medium and adapted to communicate the first set of bands of analog spectrum with the one of the at least one hybrid expansion units across the analog communication medium, each remote antenna unit further adapted to transmit and receive wireless signals over a plurality of air interfaces for the associated service provider interfaces;
    each of the plurality of remote antenna units further adapted to receive the analog reference clock signal across the analog communication medium.

2. The system of claim 1, wherein the master host unit is adapted to interface between the digital signals for the plurality of service provider interfaces and N-bit words of digitized spectrum for the plurality of communication links includes converting between the digital signals for the plurality of service provider interfaces and N-bit words of digitized spectrum for the plurality of communication links by reformatting digital data between the digital signals and the N-bit words of digitized spectrum used for communication across the at least one of the plurality of communication links between the master host unit and the hybrid expansion unit.

3. The system of claim 1, wherein the master host unit is adapted to interface between the digital signals for the plurality of service provider interfaces and N-bit words of digitized spectrum for the plurality of communication links by communicating digital data as is without reformatting between the digital signals and the N-bit words of digitized spectrum used for communication across the at least one of the plurality of communication links between the master host unit and the hybrid expansion unit.

4. The system of claim 1, wherein the master clock distribution unit generates the digital master reference clock signal based on an external reference clock external to the master host unit.

5. The system of claim 1, wherein each of the plurality of remote antenna units is further adapted to synchronize at least one component with the system using the analog reference clock.

6. The system of claim 1, wherein each of the plurality of remote antenna units is further adapted to frequency convert the first set of bands of analog spectrum to a second set of bands of analog spectrum.

7. The system of claim 1, wherein each hybrid expansion unit generates an analog reference clock signal using a phase-locked loop.

8. The system of claim 1, wherein at least one hybrid expansion unit is further configured to receive the digital master reference clock signal across one of the plurality of communication links by extracting the digital master reference clock signal from a data stream containing the N-bit words of digitized spectrum.

9. The system of claim 1, wherein the digital master reference clock signal is used to generate clock signals used to convert between the digital signals for the plurality of service provider interfaces and N-bit words of digitized spectrum for the plurality of communication links.

10. The system of claim 1, wherein the N-bit words of digitized spectrum are communicated in a data stream generated from clock signals derived from the master reference clock signal.

11. The system of claim 1, further including a digital expansion unit interposed between the master host unit and at least two hybrid expansion units.

12. The system of claim 1, wherein the at least one remote antenna unit is part of an analog remote antenna cluster.

13. The system of claim 4, wherein the external reference clock external to the master host unit is from at least one of the plurality of service provider interfaces.

14. The system of claim 4, wherein the external reference clock external to the master host unit is from at least one of a base station, a GPS unit, and a cesium atomic clock.

15. The system of claim 6, wherein the digital signals for the plurality of service provider interfaces are a digital representation of the second set of bands of analog spectrum.

16. The system of claim 10, wherein the N-bit words of digitized spectrum are extracted from the data stream at each hybrid expansion unit.

17. The system of claim 11, wherein the digital expansion unit is adapted to communicate the digital master reference clock signal over the plurality of communication links between the master host unit and the at least two hybrid expansion units.

18. The system of claim 13, wherein the master clock distribution unit derives the external reference clock signal from a data stream communicating the digital signals between the plurality of service provider interfaces and the master host unit.

19. A method comprising:
interfacing wireless spectrum for at least two wireless services at a master host unit between digital signals and N-bit words of digitized spectrum;
generating a digital master reference clock signal at the master host unit;
transporting the digitized spectrum as a multiplexed signal on a digital medium between the master host unit and a hybrid expansion unit;
transporting the digital master reference clock on the digital medium between the master host unit and the hybrid expansion unit;
converting wireless spectrum for the at least two wireless services between the N-bit words of digitized spectrum and a first set of bands of analog spectrum at the hybrid expansion unit;
generating an analog reference clock signal based on the digital master reference clock signal received at the hybrid expansion unit;
transporting the first set of bands of analog spectrum for the at least two wireless services on an analog medium between the hybrid expansion unit and at least one remote unit having an air interface for each of the at least two wireless services;
transporting the analog reference clock signal on the analog medium between the hybrid expansion unit and the at least one remote unit; and
communicating the wireless spectrum in analog format at the at least one remote unit.

20. The method of claim 19, wherein interfacing the wireless spectrum for the at least two wireless services at the master host unit between digital signals and N-bit words of digitized spectrum includes converting the wireless spectrum for the at least two wireless services at the master host unit between digital signals and N-bit words of digitized spectrum by reformatting digital data between the digital signals and the N-bit words of digitized spectrum used for transport on the digital medium between the master host unit and the hybrid expansion unit.

21. The method of claim 19, wherein interfacing the wireless spectrum for the at least two wireless services at the master host unit between digital signals and N-bit words of digitized spectrum includes communicating digital data as is without reformatting between the digital signals and the N-bit words of digitized spectrum used for transport on the digital medium between the master host unit and the hybrid expansion unit.

22. The method of claim 19, wherein generating the digital master reference clock signal at the master host unit is based on an external reference clock external to the master host unit.

23. The method of claim 19, wherein generating the analog reference clock signal includes extracting the digital master reference clock signal from a data stream containing the N-bit words of digitized spectrum and converting the digital master reference clock signal to the analog reference clock signal.

24. The method of claim 19, wherein converting the digital master reference clock signal to the analog reference clock signal occurs using a phase-locked loop.

25. The method of claim 19, further comprising:
frequency converting the first bands of analog spectrum between a first frequency and a second frequency at the hybrid expansion unit; and
wherein the second frequency is different from the first frequency.

26. The method of claim 19, wherein the analog reference clock signal and the bands of analog spectrum are transported as a multiplexed signal.

27. The method of claim 19, wherein transporting the first set of bands of analog spectrum for the at least two wireless services on an analog medium between the hybrid expansion unit and at least one remote unit includes:
transporting the first set of bands of analog spectrum to a master analog remote antenna unit;
transporting at least a first subset of the first set of bands of analog spectrum from the master analog remote antenna unit to a first slave remote antenna unit; and
transporting at least a second subset of the first set of bands of analog spectrum from the master analog remote antenna unit to a second slave remote antenna unit.

28. The method of claim 22, further comprising:
receiving the wireless spectrum for the at least two wireless services as the digital signals at the master host unit from at least one service provider interface.

29. The method of claim 22, wherein generating the external reference clock external to the master host unit is from at least one of a base station, a GPS unit, and a cesium atomic clock.

30. The method of claim 27, wherein communicating the wireless spectrum in analog format at the at least one remote unit includes:
communicating at least a first subset of wireless spectrum corresponding to the first subset of the first set of bands of analog spectrum at the first slave remote antenna unit; and
communicating at least a second subset of wireless spectrum corresponding to the second subset of the first set of bands of analog spectrum at the second slave remote antenna unit.

31. The method of claim 28, wherein generating the digital master reference clock signal at the master host unit includes deriving the external reference clock signal from a data stream containing the digital signals received from the at least one service provider interface.

32. A communication system, comprising:
a master host unit, the master host unit adapted to communicate digital signals with service provider interfaces;
a hybrid expansion unit coupled to the master host unit by a communication link, the master host unit and the hybrid expansion unit adapted to communicate N-bit words of digitized spectrum over the communication link, the hybrid expansion unit further adapted to convert between the N-bit words of digitized spectrum and a first set of bands of analog spectrum,
a remote antenna unit coupled to the hybrid expansion unit by an analog communication medium, the hybrid expansion unit and the remote antenna unit adapted to communicate the first set of bands of analog spectrum over the analog communication medium, the remote antenna unit further adapted to transmit and receive wireless signals over air interfaces;
wherein the master host unit includes a master clock distribution unit, the master clock distribution unit adapted to generate a digital master reference clock signal, the master host unit further adapted to communicate the digital master reference clock signal over the communication link;
wherein the hybrid expansion unit is further adapted to receive the digital master reference clock signal from the master host unit over the communication link, the hybrid expansion unit further adapted to generate an analog reference clock signal based on the digital master reference clock signal, the hybrid expansion unit further adapted to send the analog reference clock signal across the analog communication medium; and wherein the remote antenna unit is further adapted to receive the analog reference clock signal across the analog communication medium.

33. The system of claim 32, wherein the master host unit is further adapted to convert between the digital signals for the service provider interfaces and the N-bit words of digitized spectrum by reformatting digital data between the digital signals and the N-bit words of digitized spectrum used for communication across the at least one of the plurality of communication links between the master host unit and the hybrid expansion unit.

34. The system of claim 32, wherein the master host unit is further adapted to communicate digital data as is without reformatting between the digital signals and the N-bit words of digitized spectrum used for communication across the at least one of the plurality of communication links between the master host unit and the hybrid expansion unit.

35. The system of claim 32, wherein the master clock distribution unit is adapted to generate the digital master reference clock signal based on an external reference clock external to the master host unit.

36. The system of claim 32, wherein the external reference clock external to the master host unit is from at least one of a base station, a GPS unit, and a cesium atomic clock.

37. The system of claim 32, wherein the hybrid expansion unit is further configured to receive the digital master reference clock signal from the master host unit over the communication link by extracting the digital master reference clock signal from a data stream containing the N-bit words of digitized spectrum.

38. The system of claim 35, wherein the external reference clock external to the master host unit is from at least one of the service provider interfaces.

39. The system of claim 38, wherein the master clock distribution unit derives the external reference clock from a data stream communicating the digital signals between service provider interfaces and the master host unit.

* * * * *